(12) United States Patent  (10) Patent No.: US 8,779,780 B1
Peterson et al.  (45) Date of Patent: Jul. 15, 2014

(54) METHODS AND APPARATUS TO DETECT PRESENCE OF AN INPUT OBJECT

(75) Inventors: Jonathan R. Peterson, Everett, WA (US); Dana Olson, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 203 days.

(21) Appl. No.: 13/436,015

(22) Filed: Mar. 30, 2012

Related U.S. Application Data

(60) Provisional application No. 61/602,459, filed on Feb. 23, 2012.

(51) Int. Cl.
*G01R 27/26* (2006.01)

(52) U.S. Cl.
USPC .......................................................... 324/658

(58) Field of Classification Search
USPC ........... 324/613, 614, 658–690; 345/156–184
See application file for complete search history.

(56) References Cited

U.S. PATENT DOCUMENTS

| | | | |
|---|---|---|---|
| 6,504,530 B1 * | 1/2003 | Wilson et al. | 345/173 |
| 6,856,259 B1 | 2/2005 | Sharp | |
| 6,922,642 B2 | 7/2005 | Sullivan | |
| 7,969,410 B2 | 6/2011 | Kakarala | |
| 2004/0056845 A1 * | 3/2004 | Harkcom et al. | 345/173 |
| 2004/0056849 A1 | 3/2004 | Lohbihler et al. | |
| 2009/0009194 A1 * | 1/2009 | Seguine | 324/684 |
| 2009/0256817 A1 | 10/2009 | Perlin et al. | |
| 2010/0244859 A1 | 9/2010 | Cormier, Jr. et al. | |
| 2010/0252336 A1 * | 10/2010 | Lu et al. | 178/18.06 |
| 2010/0283752 A1 | 11/2010 | Maeda | |
| 2010/0315372 A1 * | 12/2010 | Ng | 345/174 |
| 2011/0279406 A1 * | 11/2011 | Kawaguchi et al. | 345/174 |
| 2012/0169660 A1 * | 7/2012 | Seo | 345/174 |
| 2012/0206399 A1 * | 8/2012 | Wang et al. | 345/174 |
| 2012/0287054 A1 * | 11/2012 | Kuo et al. | 345/173 |
| 2013/0100067 A1 * | 4/2013 | Dews | 345/174 |

FOREIGN PATENT DOCUMENTS

WO  2011049511 A  4/2011

OTHER PUBLICATIONS

Rick Kjeldsen, et al._Interacting With Steerable Projected Displays_Dated May 20, 2002_6 pages.
Samuel A. Iacolina_Improving FTIR Based Multi-Touch Sensors with IR Shadow Tracking_Dated Apr. 4, 2009_5 pages.
Search Report for U.S. Appl. No. 13/436,015, Dated Mar. 2012, 27 pages.

* cited by examiner

*Primary Examiner* — Patrick Assouad
*Assistant Examiner* — Demetrius Pretlow (57) ABSTRACT

A method and apparatus use a plurality of first region values to calculate a second region value, each of the plurality of first region values reflecting sensor element activity in a corresponding region of an input module, the second region value reflecting sensor element activity of a group of the corresponding regions. The method and apparatus determine that the input object is present relative to the group of the corresponding regions if the second region value meets or exceeds a threshold presence value.

17 Claims, 8 Drawing Sheets

METHODS AND APPARATUS TO DETECT PRESENCE OF AN INPUT OBJECT

RELATED MATTERS

This application claims the priority benefit of U.S. Provisional Application No. 61/602,459, filed Feb. 23, 2012, which is incorporated herein by reference in its entirety.

TECHNICAL FIELD

The subject matter relates to the field of interpreting user input. More specifically, but not by way of limitation, the claimed subject matter discloses techniques for detecting presence of an input object.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring a change in capacitance associated with the capacitive sensor elements to determine a presence conductive object relative to the capacitive sensor elements. The measured changes in capacitance may be used to calculate a centroid that indicates position of the conductive object. The conductive object may be, for example, a stylus or a user's finger.

Noise signals from various sources may affect accuracy and consistency in detecting a presence of a conductive object. When a detected presence is used to determine further information about a conductive object, such as the position of a conductive object, the noise may also affect the accuracy and consistency of that further information.

BRIEF DESCRIPTION OF THE DRAWINGS

Some embodiments are illustrated by way of example and not limitation in the figures of the accompanying drawings in which.

DETAILED DESCRIPTION

Methods and apparatus to detect presence of an input object are discussed. In the following description, for purposes of explanation, numerous examples are set forth in order to provide a thorough understanding of embodiments. It will be evident to one skilled in the art that the claimed subject matter may be practiced in other embodiments.

The detailed description discloses examples of technology that, among other things, detects presence of an input object (e.g., a finger) relative to a group of regions of an input module (e.g., a touchscreen). Some embodiments are now briefly introduced and then discussed in more detail along with other embodiments beginning with FIG. 1.

Touch input and/or noise signals can affect the output of sensor elements in a touchscreen. When the sensor elements are organized into regions of the touchscreen, a sensing module may represent the effect of touch input and/or noise signals with region values. For example, a region value may reflect a change in capacitance of the sensor elements within a region.

In an embodiment, the sensing module groups multiple regions together and determines, based on the region values of the group, whether or not an input object is present relative to the group of regions. For example, the sensing module can sum region values within a group of regions and determine that a finger is present relative to the group of regions if the sum of region values meets or exceeds a group threshold value (e.g., presence threshold value). Group summing can be used to verify presence detection that is based on a single region value meeting a region threshold value (e.g., a presence threshold value that is relatively smaller that the group threshold value).

In an embodiment, a presence indicator based on multiple region values (e.g., the sum of region values in a group), has a greater signal-to-noise ratio than another presence indicator generated from fewer than the multiple region values (e.g., one region value). Thus, using the multiple region values to detect presence results in fewer false positive presence detections. Further, group level presence detection allows for presence to be detected with increased confidence when region values resulting from a same touch can vary depending on where the touch is placed relative to regions and sensing circuitry.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

Figure 1:
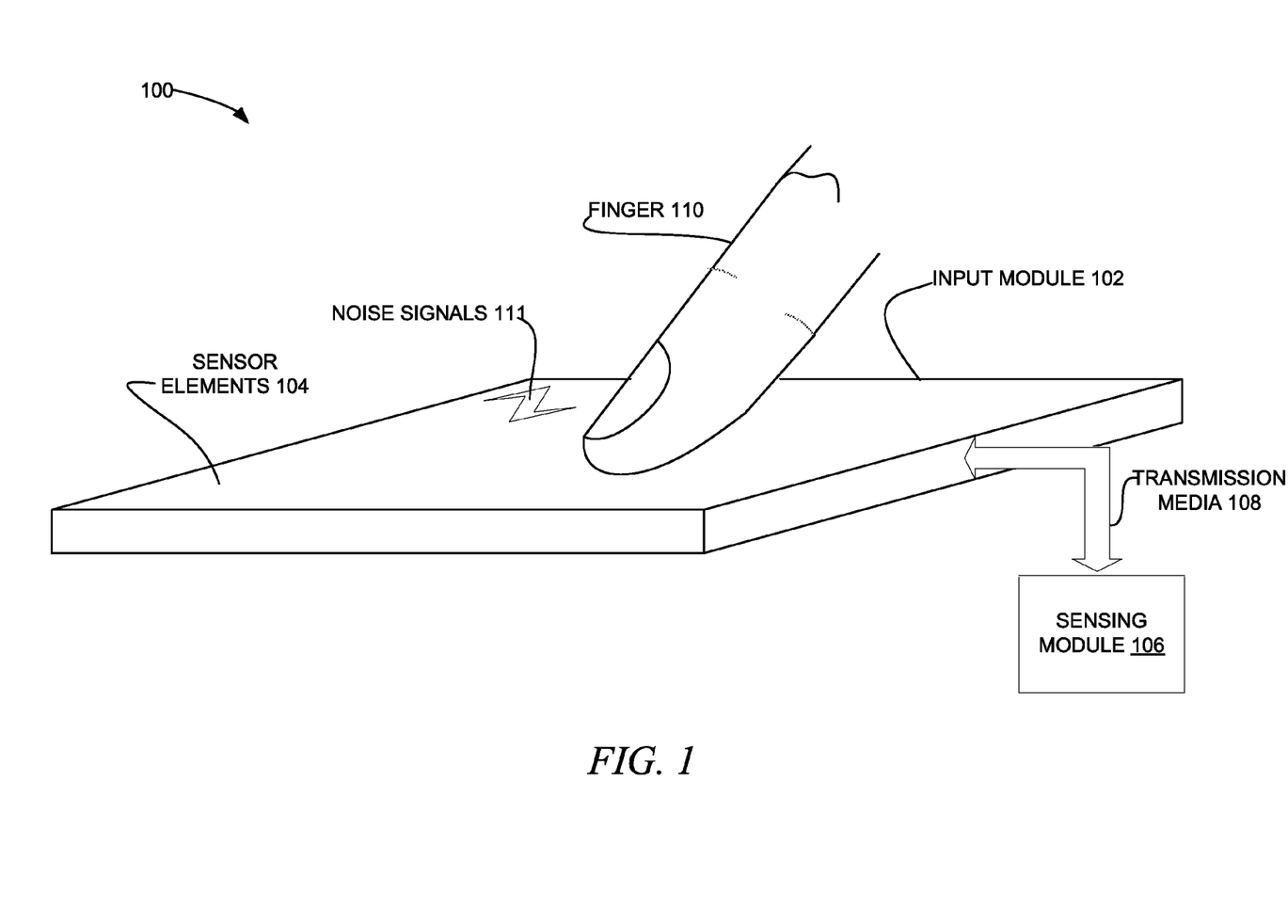
FIG. 1 is a block diagram illustrating an example sensing system, in accordance with various embodiments.

FIG. 1 is a block diagram illustrating an example sensing system 100, in accordance with various embodiments. The sensing system 100 is shown to include an input module 102 coupled to a sensing module 106.

The input module 102 is to receive input from an input object (e.g., a finger 110). The input module 102 may include a touch pad, a touchscreen, or any other interface to receive input from an input object. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The input module 102 is shown to include sensor elements 104. In various example embodiments, the sensor elements 104 may include one or more of light-sensitive elements, light emitting elements, photo-sensitive elements, pressure sensitive elements, and/or capacitive sensor elements. In some embodiments, the sensor elements are embedded into an image display of the input module 102. This is sometimes referred to as in-cell sensing. For example, a photosensitive element may be embedded into each display pixel of the image display. The photosensitive element senses light reflected by an input object back into the cell. As will be described with respect to FIG. 2, the sensor elements 104 may be organized into multiple regions of the input module 102.

A finger 110 is shown to be proximate to the input module 102 of FIG. 1 and is an example of an input object providing input to the input module 102. In various embodiments, the input object may be a non-conductive object, a conductive object (e.g., a finger or stylus) and/or may produce light or other energy (e.g., to be sensed through the sensor elements 104). The input object may be fixed in position or moveable in position relative to the input module 102. For example, a user may move the finger 110 relative to the input module 102. The user may include a human, a mechanism, a machine, and/or programmed instructions. Alternatively or additionally, the input module 102 may be allowed to move relative to a fixed or movable input object.

Sensor elements 104 may be activated by input objects such as the finger 110 and/or noise signals such as the noise signal 111. Noise signals 111 may include, but not be limited to electrical noise. The sensing module 106 is to sense or detect, through the sensor elements 104, a presence of one or more input objects proximate one or more of the sensor elements 104 of the input module 102. The activation of sensor elements by the noise signal 111 could be mistakenly detected as the presence of an input object. Embodiments of the sensing module 106 described herein avoid mistaking sensor element activation caused by noise signals for the presence of an input object.

The sensing module 106 may perform scan operations to sense, through the sensor elements 104, signals reflecting pressure applied to the input module 102, light (e.g., infrared light) associated with the input object, images of the input object, and/or capacitances of the sensor elements 104 when an input object are/or noise signals are present. In an example scan operation, the sensing module 106 exchanges energy with the input module 102 through the transmission media 108. The transmission media 108 may include any medium through which the energy may be conveyed. For some embodiments, the transmission media 108 includes metal trace (e.g., copper wire) over which current can flow. Alternatively or additionally, the energy may be exchanged over a wireless transmission media. In one embodiment of a scan operation, the sensing module 106 applies a voltage to one or more of the sensor elements 104 (e.g., capacitive sensor elements) through the transmission media 108 to form a capacitance. The sensing module 106 may alternatively or additionally detect a current or voltage received from the one or more of the sensor elements 104.

As introduced above, the sensor elements 104 may be organized into different regions of the input module 102. Region values associated with regions of the input module are discussed with respect to FIG. 2.

Figure 2:
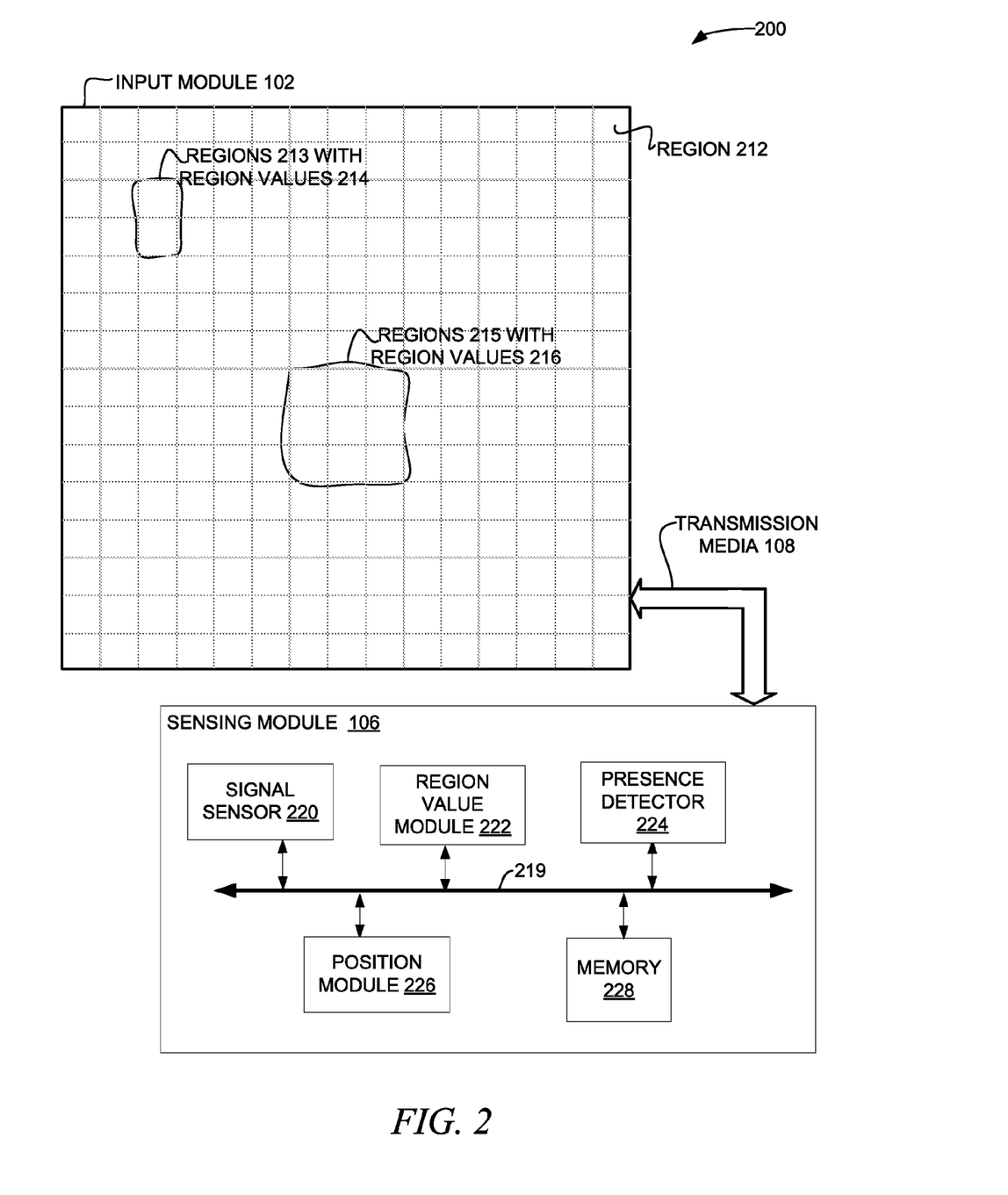
FIG. 2 is block diagram illustrating regions with region values processed by a sensing module, in accordance with embodiments.

FIG. 2 is block diagram 200 illustrating regions 213 and 215 with region values 214 and 216 to be processed by the sensing system 106, in accordance with embodiments. FIG. 2 is shown to include the input module 102 organized into a grid of regions. Each region is shown as a square, such as the region 212 at the top right corner of the input module 102. It should be noted that in some embodiments, the size, shape, and organization of regions may be different from those shown in FIG. 2 without departing from the claimed subject matter.

Regions 213 and 215 of the input module 102 are shown to include region values 214 and 216, respectively. In general, a region value represents a change in output from a region and is generated through signals from one or more sensor elements within the region. In an embodiment, the region values 214 correspond to the noise signal 111 of FIG. 1 and the region values 216 correspond to the finger 110 of FIG. 1. As will be discussed in more detail below, the sensing module 106 uses region values to determine whether or not an input object is present relative to the input module 102.

The sensing module 106 is shown to include a signal sensor 220, a region value module 222, a presence detector 224, a position module 226, and a memory 228 coupled to one another through a bus 219, any of which may be implemented using hardware, software, or a combination of hardware and software.

The signal sensor 220 is to receive sensor signals from sensor elements of each region. The signal sensor 220 may receive a separate sensor signal for each region through the transmission media 108 and the sensor signals may reflect capacitance, pressure, light, images, and/or any other indication of an input object. As introduced above, the sensor elements of a region can be activated not only by proximity of an input object but also by noise signals. As a result, the signal sensor 220 may receive sensor signals responsive to an input object, noise signals, and/or a combination of the two. In an embodiment, sensor signals from sensor elements become degraded (e.g., signal degradation) by amount that depends on the path (e.g., the length and electrical circuitry) between the sensor elements and the signal sensor 220.

In an embodiment, the number and magnitude of sensor signals received by the signal sensor 220 depends on where and how an input object is placed relative to the regions of the input module 102. For example, if an input object is placed so as to have an effect on one region (e.g., the one or more sensor elements of that region), the sensor signal from that region may be of corresponding magnitude. If the input object is placed so as to have an evenly distributed effect on multiple regions (e.g., the sensor elements of those regions), the sensor signals from the multiple regions may be of corresponding distributed magnitude.

In an embodiment, the signal sensor 220 performs scan operations described above with respect to FIG. 1 to obtain sensor signals reflecting capacitance (e.g., mutual capacitance) of the sensor elements of each region. In an embodiment, the signal sensor 220 includes an analog-to-digital conversion circuit to convert analog capacitance values to digital capacitance values, which are used by the region value module 222 to determine a region value for each region.

The region value module 222 is to generate a region value for each region of the input module based on signal values provided by the signal sensor 220. The region value reflects an effect on a region due to presence of an input object and/or signal noise. In embodiments described below with respect to FIGS. 3 and 4 the region value module 222 generates the region values 214 and 216 for the regions 213 and 215, respectively, of FIG. 2.

The region value module 222 may use a signal value itself as a region value and/or calculate the region value as a function of the signal value. In an embodiment, a region value reflects a difference between a first signal value (e.g., a baseline signal value) of a region, when a noise signal and an input object are absent, and second signal value of the region when a noise signal and/or the input object are present. For example, the region value module 222 may determine a region value as a difference between a capacitance value of a region when the finger 110 is not present, with the capacitance value of the region when the finger 110 is present. In embodiments described with respect to FIGS. 3, 4, and 7, the region value module 222 expresses region values as numerical values.

As introduced above, the number and magnitude of sensor signals depend on where and how an input object is placed relative to sensor elements. Since the region value module 222 determines region values based on sensor signal values, the number and magnitude of region values also depends on placement of the input object. Assuming an absence of noise and signal degradation, the region value module 222 may generate a maximum region value when an input object is placed so as to affect one region, and may generate a minimum region value when the input object is placed so as to have an evenly distributed effect on multiple regions.

The presence detector 224 is to determine whether or not one or more region values of the input module 102 indicate the presence of an input object. Once a presence has been detected, the position module 226 may use the region values of the detected presence to calculate a position of the detected presence relative to the input module 102. For example, the calculated position may be expressed as a point in an X-Y coordinate system defined for the input module 102 of FIG. 1. In an embodiment, the position module 226 uses the presence values in a centroid algorithm to calculate the X-Y position. However, the position may be expressed with more or less than two-dimensions in other embodiments.

Returning to the discussion of presence detection, in one embodiment, the presence detector 224 can determine presence if a region value of one region meets or exceeds a region threshold value, and that region value is greater than or equal to the regions values of adjacent regions (e.g., adjacent to the sides of the one region). In this technique, the region threshold value is selected such that it is low enough to be met by the minimum region value, discussed above, defined for a valid touch of an input object. In an embodiment, the region threshold value may be lower still to account for variation in signal degradation between regions and the signal sensor 220. The region threshold value, which is lowered to tune for the various region values of a valid touch, can be problematic. When a region value resulting entirely or in part from a noise signal meets or exceeds the region threshold value described above, the presence detector 224 may mistakenly determine the presence of an input object.

To mitigate the negative effects of noise signals on presence detection, the presence detector 224 can use multiple regions values, of a group of regions, as an indicator to determine whether or not an input object is proximate to the group of regions. Although one or more of the multiple region values may correspond to noise signals, the presence detector 224 can effectively distribute the noise signals over the multiple region values of the group.

Using multiple regions values to detect presence or absence of an input object may include the presence detector 224 determining output of a function that takes the multiple region values as input. If the presence detector 224 determines that the output satisfies a user defined condition, the presence detector 224 may detect a presence of an input object, otherwise the presence detector 224 may detect absence of the input object. For example, the presence detector 224 can determine presence of the finger 110 of FIG. 1 if a sum of multiple region values (e.g., of the regions 215 of FIG. 2) meets or exceeds a group threshold value (e.g., a threshold presence value). The presence detector 224 can determine absence of the finger 110 of FIG. 1 if the sum of multiple region values (e.g., of the regions 213) does not meet or exceed the group threshold value. Using the group threshold value to detect presence of the finger 110 of FIG. 1 relative to the regions 215 is described in more detail with respect to FIG. 3, and using the group threshold value to determine absence of the finger 110 of FIG. 1 relative to the regions 213 is described with respect to FIG. 4.

Figure 3:
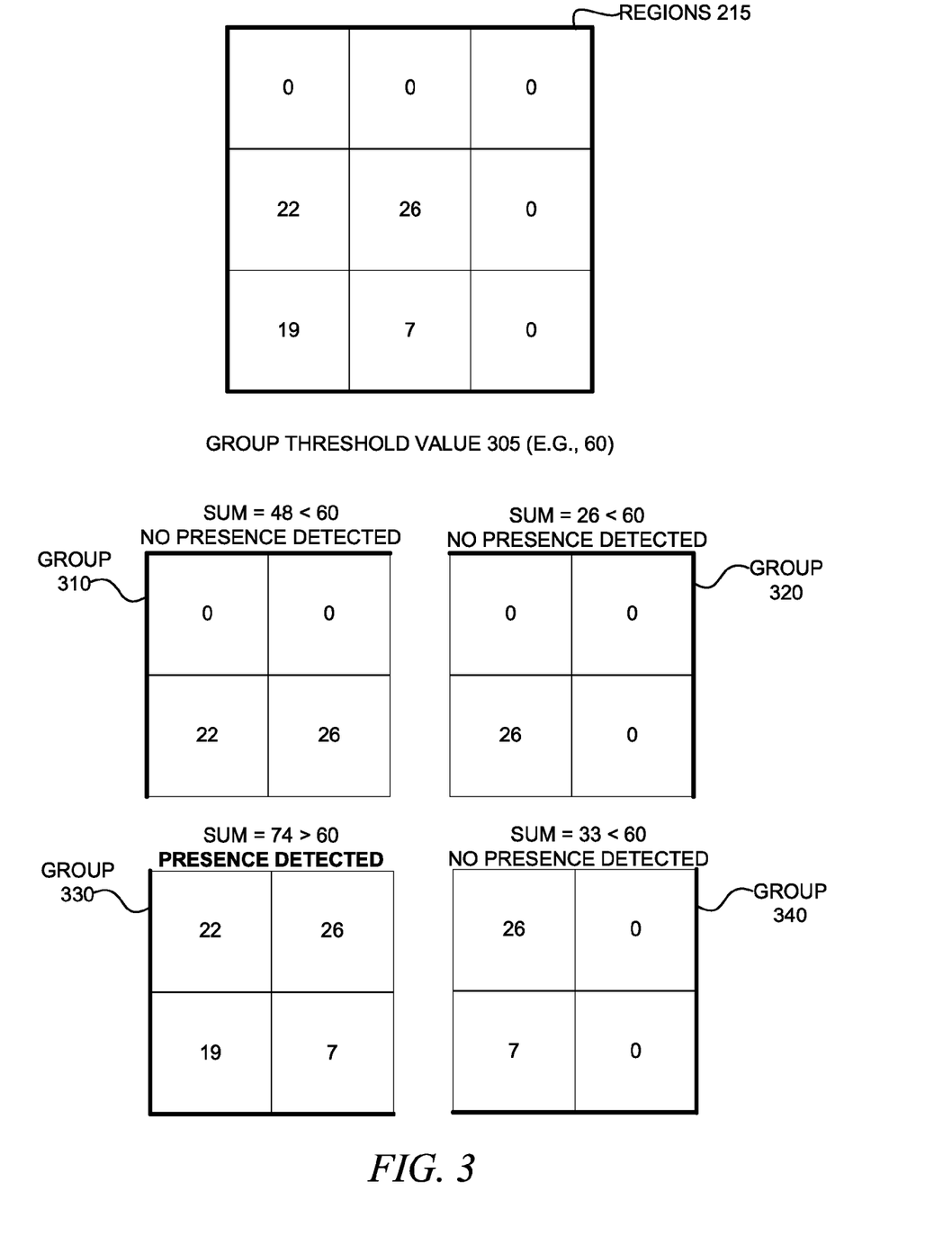
FIG. 3 is a block diagram illustrating groups of regions whose region values are summed to determine that input object is present, in accordance with an embodiment.

FIG. 3 is a block diagram illustrating groups 310, 320, 330, and 340 of regions 215 whose region values are summed to determine that an input object is present, in accordance with an embodiment. FIG. 3 is shown to include the regions 215 of FIG. 2 including example numerical values of the region values 216 of FIG. 2. In the regions 215, the region values of zero indicate that the finger 110 and/or the noise signals 111 do not affect the sensor elements within those regions. The region values of 22, 26, 19, and 7 reflect the effect of the finger 110 and/or the noise signals 111 on the regions in which the region values appear.

The regions 215 are shown to be separated into groups 310, 320, 330, and 340. Each of the groups 310, 320, 330, and 340 is square in shape and includes four regions. The groups 310, 320, 330, and 340 are shown to be overlapping such that each group includes regions in common with another group. In other embodiments that accord with the claimed subject matter, groups may be non-overlapping and/or include more or less than four regions. For example, a group may include five regions including one region in the center and a region adjacent to each side of the center region (e.g., forming the shape of a plus sign). The shape of groups and/or the number of regions within each group may be selected based on the characteristics of the input objects used to provide input and/or how the input object is expected to be used. Alternatively or additionally, in order to further improve the accuracy of presence detection, the presence detector 224 may apply a weight factor to increase or decrease certain region values of a group. In an embodiment, the weight factor applied to a region value depends on the location of the region relative to the shape of the group.

In an embodiment, the presence detector 224 of FIG. 2 sums the region values of each group 310, 320, 330, and 340. For example, the presence detector 224 may sum in the order: group 310, group 320, group 330, and group 340, starting from the top left of the regions 215 and ending at the bottom right of the region 215. It should be noted, however, that groups may be summed in another order without departing from the claimed subject matter. In some embodiments, the presence detector 224 of FIG. 2 may limit summing to groups of regions that include at least one non-zero region value. Alternatively or additionally, the presence detector 224 may sum groups of regions across the entire input module of FIG. 2, regardless of whether all the groups includes non-zero region values.

After the presence detector 224 has determined a sum for each group 310, 320, 330, and 340, the presence detector 224 may determine presence of the finger 110 of FIG. 1 if the sum of region values for the group meets or exceeds a group threshold value 305, which may be stored in the memory 228 of FIG. 1. In an embodiment, the group threshold value 305 of FIG. 3 is set to a multiple of a region threshold value (e.g., 3 or 4 times the region threshold value), but the group threshold value 305 may vary for different embodiments. In some embodiments, the group threshold value 305 may be user-selected during a development or manufacturing process (e.g., on the bench) and/or after the sensing module 106 of FIG. 1 is released to the field (e.g., as a commercially available product).

In FIG. 3, where an example group threshold value 305 is 60, the presence detector 224 of FIG. 2 would not detect the finger 110 of FIG. 1 based on the region values of the groups 310, 320, and 340 because their sums of 48, 26, and 33, respectively, are less than 60. The presence detector 224 of FIG. 2 would detect the finger 110 based on the region values of the group 330 because their sum of 74 is greater than 60. Even if one or more of the region values in the group 330 includes components due to noise signals, the presence detector 224 of FIG. 2 can determine or verify presence of the finger 110, with improved confidence, by effectively distributing the noise signals over the region values of the group 330.

Figure 4:
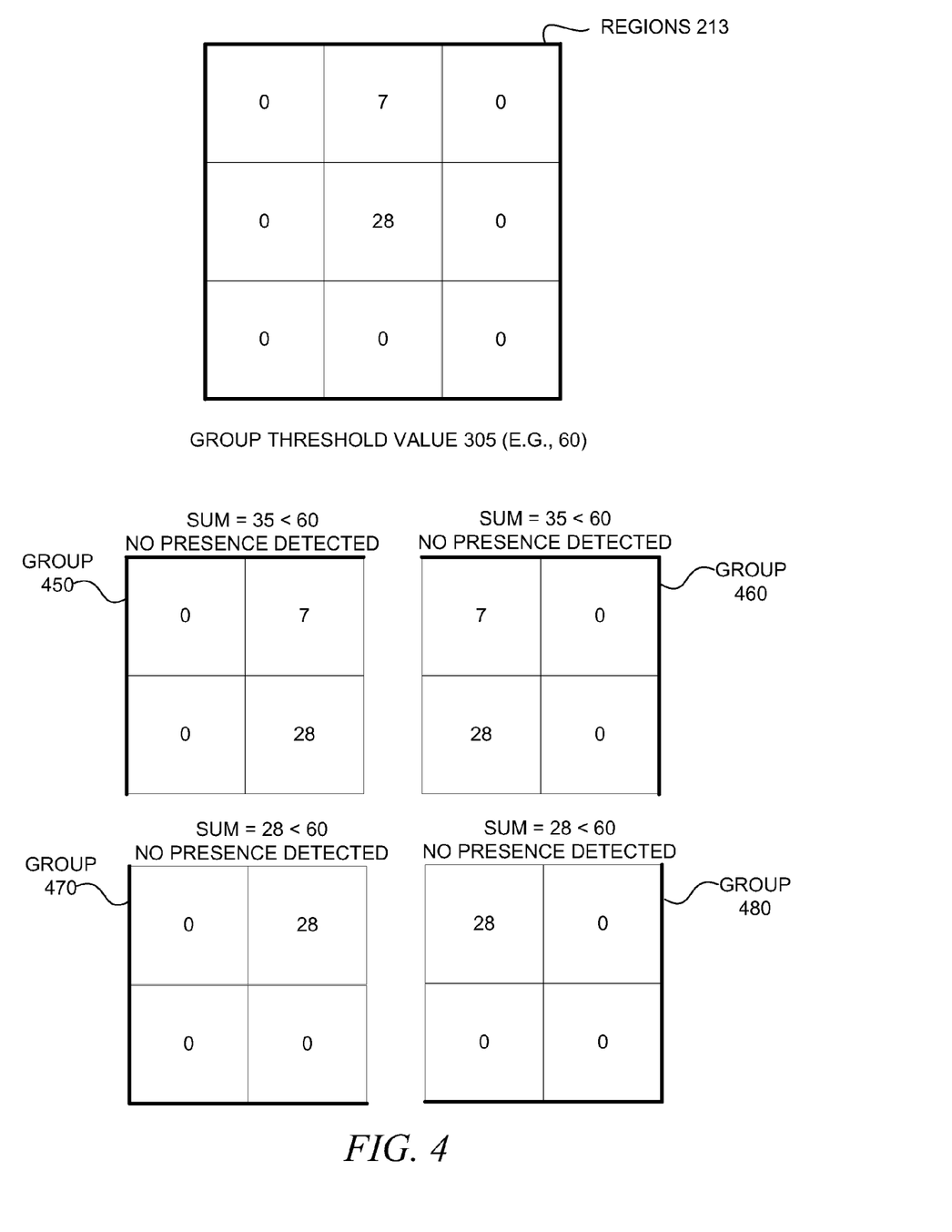
FIG. 4 is a block diagram illustrating groups of regions whose region values are summed to determine that an input object is not present, in accordance with an embodiment.

FIG. 4 is a block diagram illustrating groups 450, 460, 470, and 480 of regions 213 whose region values are summed to determine that an input object is not present, in accordance with an embodiment. FIG. 4 illustrates how the presence detector 224 can rule out presence of an input object such as the finger 110 of FIG. 1 even the noise signal 111 of FIG. 1 results in a region value that meets or exceeds the region threshold value 305 discussed above.

FIG. 4 is shown to include the regions 213 of FIG. 2 including example numerical values of the region values 214. In the regions 213, the region values of zero indicate that neither the finger 110 nor the noise signals 111 of FIG. 1 affect the sensor elements within those regions. In this embodiment, the region values of 7 and 28 of the regions 213 result from the noise signal 111 of FIG. 1. The groups 450, 460, 470, and 480 are shown to be the same or similar in shape and number of regions as the groups 310, 320, 330, and 340 of FIG. 3.

In an example embodiment, the presence detector 224 of FIG. 2 sums the region values of each group 450, 460, 470, 480 as was explained with respect to FIG. 3. For the example where the group threshold value is 60 and the region threshold value is 20, the presence detector 224 of FIG. 2 would not detect an input object based on the region values of any of the groups 450, 460, 470, and 480, even when the region value 28 of the regions 213, which is caused by noise signals, exceeds the region threshold value of 20. The presence detector 224 can determine an absence of the finger 110 of FIG. 1, or any other input object, because the sum of the regions values of each group 450, 460, 470, and 480 (e.g., 35, 35, 28, and 28) are all less than the group threshold value 305 of 60.

Figure 5:
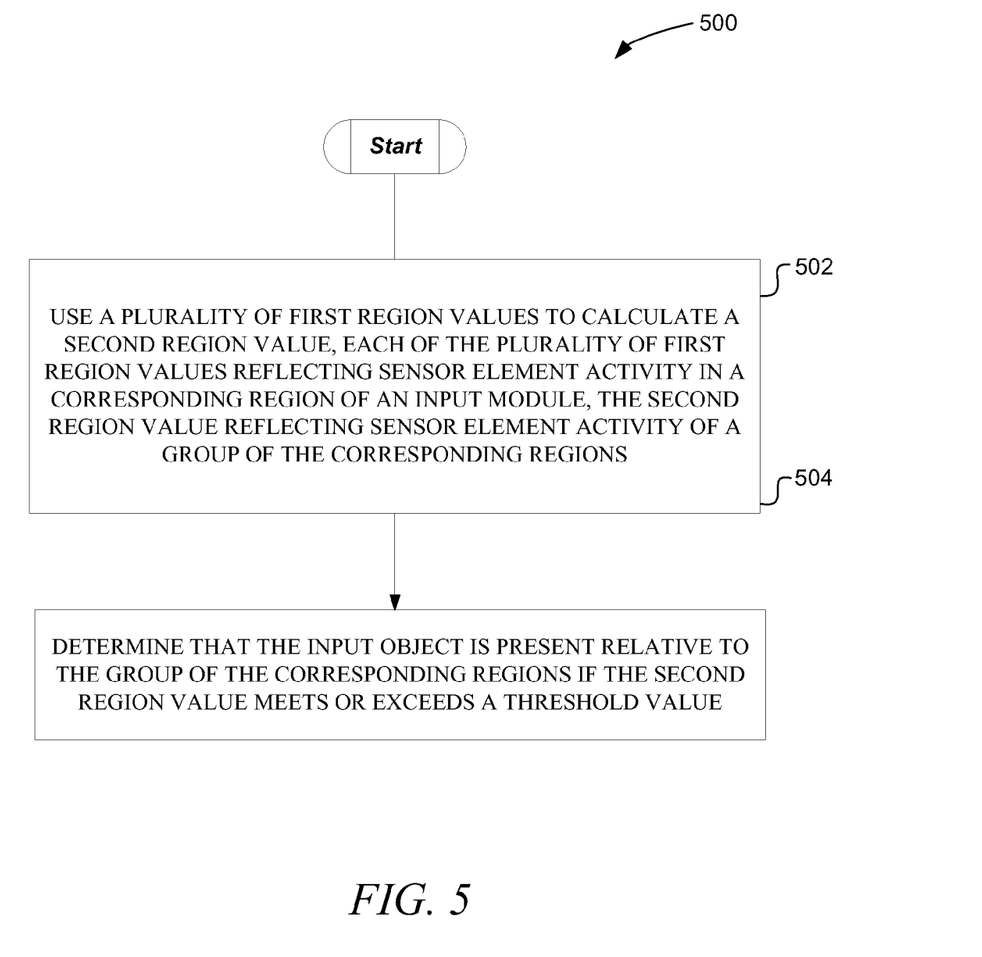
FIG. 5 is a flow diagram illustrating a method for detecting a presence of an input object, in accordance with an embodiment.

FIG. 5 is a flow diagram illustrating a method 500 of detecting a presence of an input object, in accordance with an embodiment. A description of the method 500 refers to components of drawings referred to above for the purpose of explanation and not to limit the claimed subject matter. It will be noted that the methods described herein may be performed by hardware, software, or a combination of hardware and software.

At block 502, the method 500 includes using a plurality of first regions values to calculate a second region value. In an embodiment, each of the plurality of first region values reflects sensor element activity in a corresponding region of an input module. The second region value may reflect sensor element activity in a group of corresponding regions.

In an embodiment, the signal sensor 220 of FIG. 2 determines the sensor element activity as a change in mutual capacitance at an intersection of sensor elements within each corresponding region. The region value module 222 of FIG. 2 may generate each of the first region values as a difference between a baseline mutual capacitance of the sensor elements and a subsequent mutual capacitance of the capacitive sensor elements induced by presence of the finger 110 and/or the noise signals 111 of FIG. 1.

In an embodiment, the presence detector 224 of FIG. 2 calculates the second region value as a sum of the plurality of first region values. The presence detector 224 may apply a weight factor to one or more of the first region values as part of the calculation of the second region value. The weight factor may be applied to improve accuracy of presence detection. In embodiments, the presence detector 224 calculates the second region value such that a signal-to-noise ratio of the second region value is greater than a lowest signal-to-noise ratio out of the plurality of first region values. In an embodiment, the second region value is more reliable indicator of presence because of its greater signal to noise ratio.

Returning to FIG. 5, at block 504, the method 500 includes determining that the input object is present relative to the group of the corresponding regions if the second region value meets or exceeds a group threshold value. In an embodiment, the presence detector 224 of FIG. 2 can either determine the presence of the finger 110 of FIG. 1 if the second region value at least meets the group threshold value 350 of FIG. 3 or the absence of the finger 110 of FIG. 1 if the second region value fails to meet the group threshold value 350 of FIG. 1.

The method 500 may be used either alone or in combination with other techniques for detecting presence. In an embodiment, the method 500 explained above is used to verify and provide additional confidence about a determination of presence that was based on a region value meeting a region threshold value and that region value being greater than the region values of adjacent regions.

When the presence detector 224 of FIG. 2 does detect the finger 110 of FIG. 1, the position module 226 of FIG. 2 may determine a position of the finger 110 of FIG. 1 in a coordinate system of the input module 102 using one or more of the plurality of first region values. For example, the position module 226 may use the one or more region values as input in a centroid algorithm where the output is coordinate position in the coordinate system of the input module 102.

Through the embodiments described herein, an improved presence indicator, generated from multiple region values, has a greater signal-to-noise ratio than a presence indicator generated from fewer than the multiple region values. Obtaining the region values used to generate the improved presence indicator is convenient because they are already made available in the sensing system for other uses such as position calculation. Using the improved presence indicator to detect presence results in fewer false positive presence detections compared to other presence detection techniques. Further, the improved presence indicator allows for presence to be detected with increased confidence in an environment where region values of a same touch can vary depending on where the touch is placed relative to regions and sensing circuitry.

Figure 6:
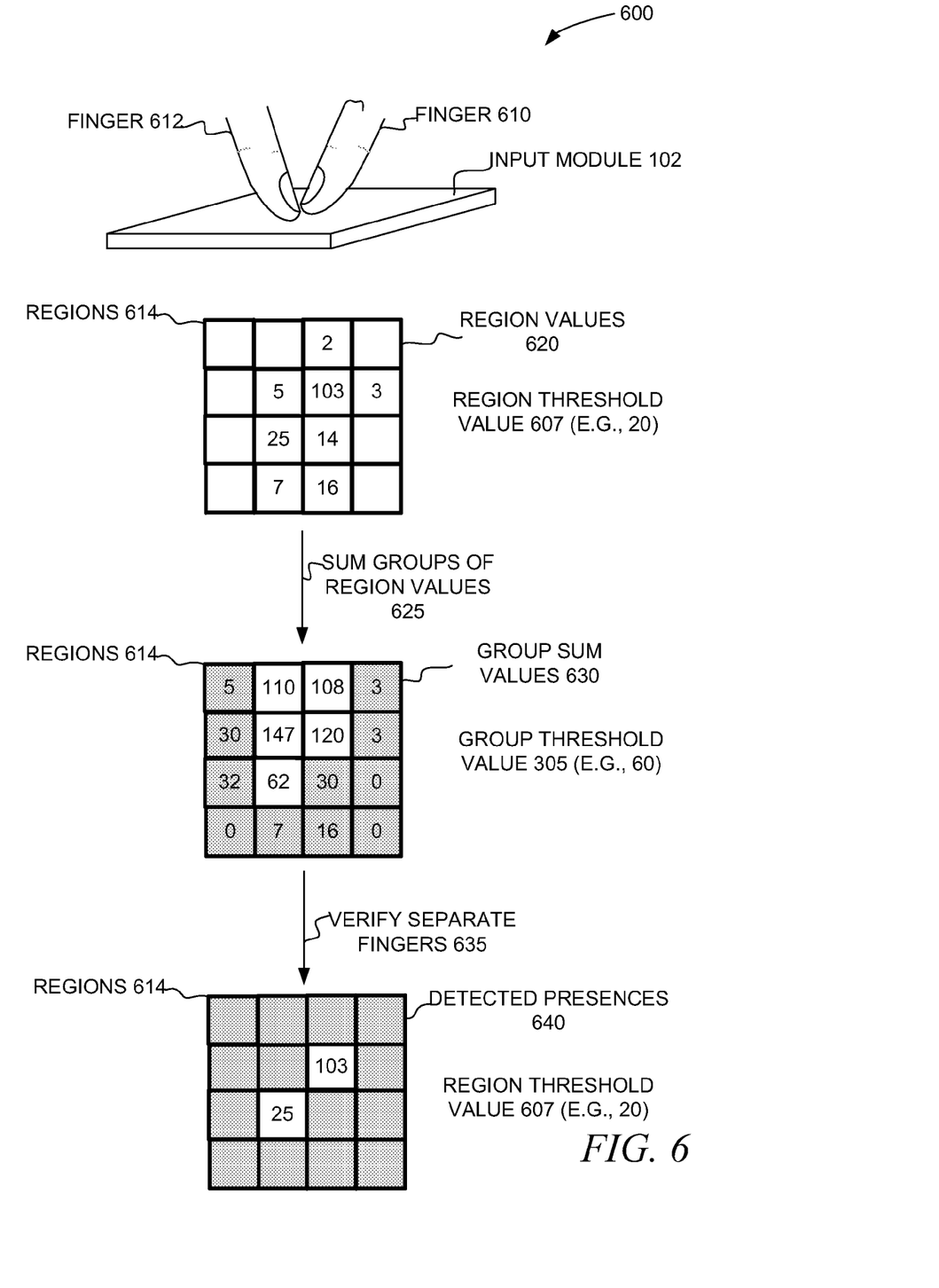
FIG. 6 is a block diagram illustrating region values that are summed to detect presence of multiple fingers, in accordance with an embodiment.

FIG. 6 is a block diagram illustrating region values that are summed to detect presence of multiple fingers, in accordance with an embodiment. FIG. 6 is shown to include two fingers 610 and 612 being applied to the input module 102. The region values 620 corresponding to the fingers 610 and 612 are shown in the regions 614 of the input module 102. The region values 620 illustrate that, although the fingers 610 and 612 are applied, the region value module 222 of FIG. 2 may not distinguish which of the region values 620 correspond to the finger 610 and which of the region values 620 correspond to the finger 612. Instead, the region values corresponding to each finger 610 and 612 are merged with one another and the presence detector 224 of FIG. 2 may determine how many fingers are being applied, if any.

In an embodiment, the presence detector 224 of FIG. 2 may first use a region threshold value 607 to detect presence of each finger 610 and 612 and then verify the presence of each finger 610 and 612 using the group threshold value 305. For example, the presence detector 224 of FIG. 2 may detect the finger 610 because the region value of 103 is greater than a region threshold 607 of 20 and the region value of 103 is greater than the adjacent region values of 5, 2, 3, and 14. The presence detector 224 may detect the finger 612 because the region value of 25 is greater than the region threshold of 20 and the region value of 25 is greater than the adjacent region values of 0, 5, 14, and 7. Since, for reasons discussed above, this technique is susceptible to false positive presence detection due to noise signals, there may be a lack of confidence in the detection of the two fingers 610 and 612. For example, if the region value of 25 exceeded the region threshold value 607 of 20 only because of the effect of a noise signal, detection of the finger 612 would be in error.

The group sum values 630 shown in the regions 614 include the results of summing the region value 620 by groups of regions. Examples of summing by group are described above with respect to FIGS. 3 and 4. In this embodiment, the group sum value of each square shaped, four region group is shown in the regions 614 at the top left region of each group. The group sum values 630 that do not meet or exceed the group threshold value 305 of 60 are shown to be shaded, while the group sum values 630 that do meet or exceed the group threshold value 305 of 60 (e.g., 110, 108, 147, 120, and 62) are shown to be un-shaded. The group sum values 630 that meet or exceed the group threshold value 305 indicate the presence of one or more fingers (e.g., the finger 610 and/or the finger 612) relative to the region in which that group sum value appears. In an embodiment, group sum values of 110, 108, 147, 120, and 62 do not necessarily indicate five different fingers because the same finger may be associated with more than one group of regions.

In an embodiment, the number of fingers indicated by the group sum values of 110, 108, 147, 120, and 62 is revealed through the underlying region values in which those group sum values are shown. For example, if the region value underlying a group sum value meets or exceeds the region threshold value 607 and that region value is greater than or equal to the region values of adjacent regions, presence of a distinct finger can be verified. Referring to the detected presences 640 of the regions 614, the underlying region values that do not meet or exceed the region threshold value 607 and/or are not greater than or equal to region values of adjacent regions are not shown as they were in the region values 620. The detected presences 640 do show the underlying region values of 103 and 25 that do meet these conditions, and each of these remaining region values represent presence of a distinct finger (e.g., the finger 610 and 612).

Figure 7:
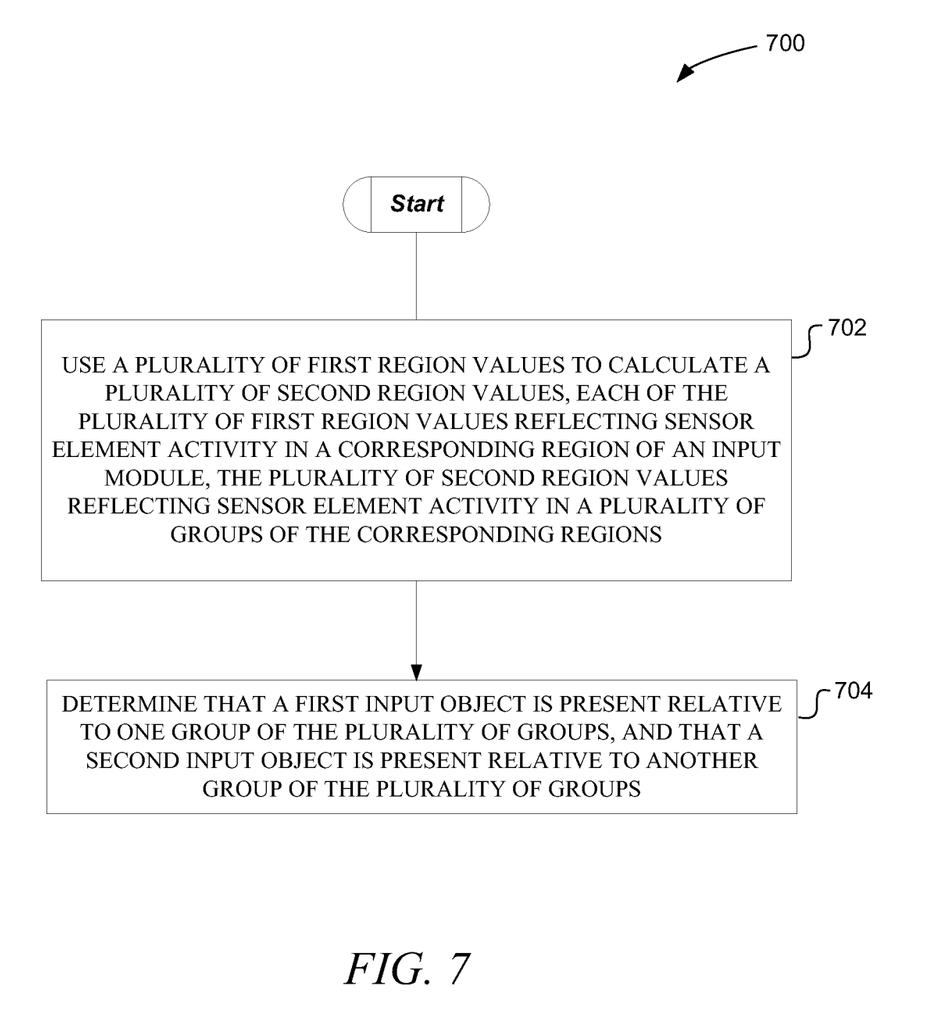
FIG. 7 is a flow diagram illustrating a method for detecting presence of multiple input objects, in accordance with embodiments.

FIG. 7 is a flow diagram illustrating a method 700 for detecting presence of multiple input objects, in accordance with embodiments. A description of the method 700 refers to components of drawings referred to above for the purpose of explanation and not to limit the claimed subject matter. It will be noted that the methods described herein may be performed by hardware, software, or a combination of hardware and software.

At block 702, the method 700 includes using a plurality of first region values to calculate a plurality of second region values, each of the plurality of first region values reflecting sensor element activity in a corresponding region of an input module, the plurality of second region values reflecting sensor element activity in a plurality of groups of the corresponding regions. For example, as described with respect to FIG. 6, the presence detector 224 of FIG. 2 may calculate the group sum values of 110, 108, 147, 120, and 62 shown in the group sum value 630 of FIG. 6 using the region values 620 of FIG. 6 (e.g., the first region values).

At block 704, the method 700 includes determining that a first input object is present relative to one group of the plurality of groups, and that a second input object is present relative to another group of the plurality of groups. Continuing with the example introduced with respect to block 702, to determine the presence of the two fingers 610 and 612 of FIG. 6, the presence detector 224 of FIG. 2 first identifies the group sum values 630 that meet or exceed the group threshold value 305, and then identifies region values 620 underlying of each of those group sum values that meet or exceed the region threshold value 607 and are greater than or equal to the region values of adjacent regions.

Thus, the processes described with respect to FIGS. 6 and 7 use single region value/region threshold value based detection and a multiple region values/group threshold value based detection to detect the separate fingers 610 and 612 from the region values 620 with improved confidence over the single region value/region threshold value based detection alone.

Figure 8:
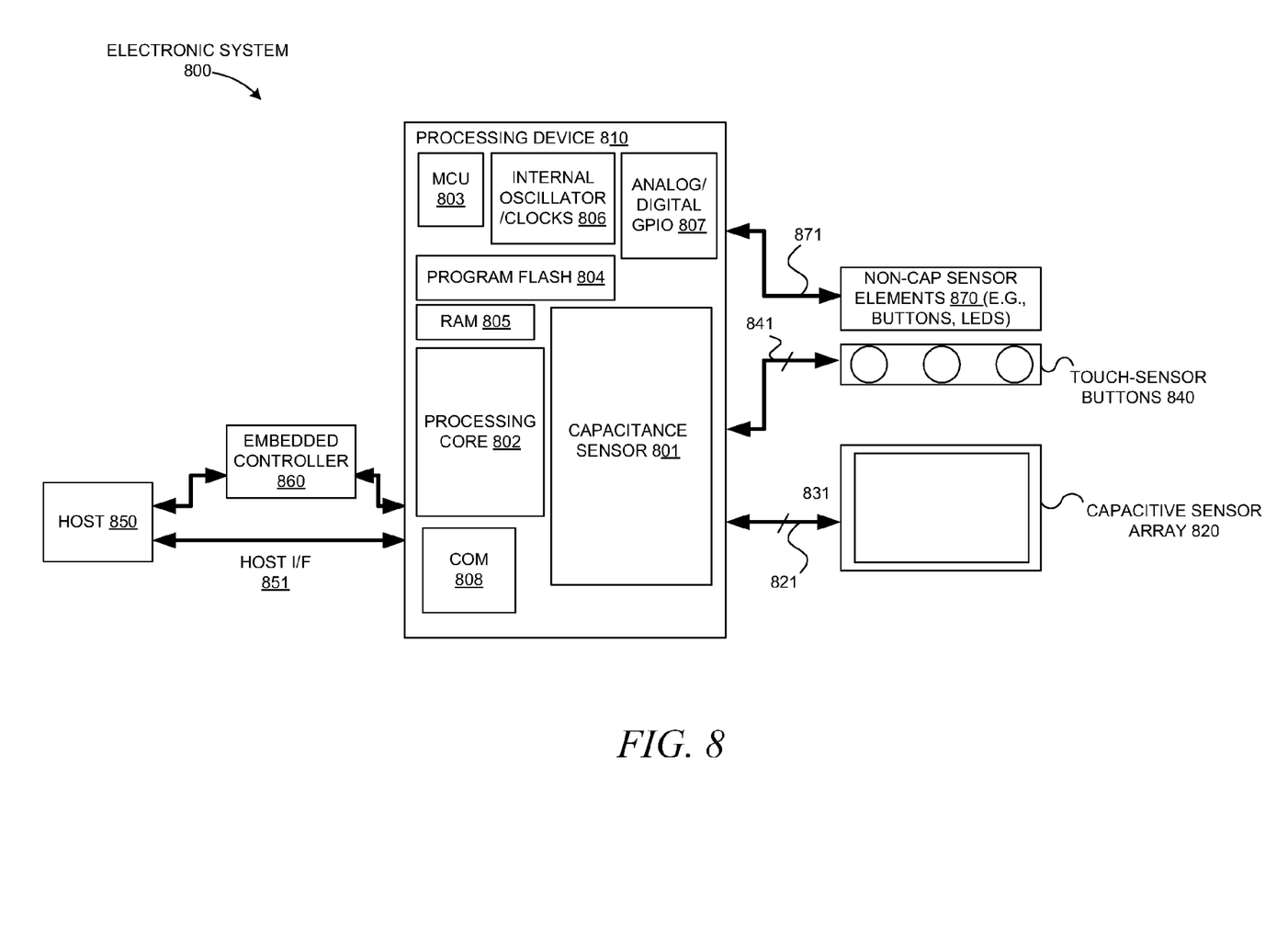
FIG. 8 is a block diagram illustrating an electronic system to detect a presence of a conductive object on a capacitive sensor array, in accordance with various embodiments.

FIG. 8 is a block diagram illustrating an electronic system 800 to detect a presence of a conductive object on a capacitive sensor array 820, in accordance with various embodiments.

The electronic system 800 includes a processing device 810, the capacitive sensor array 820, touch-sensor buttons 840, host processor 850, embedded controller 860, and non-capacitance sensor elements 870. The processing device 810 may include analog and/or digital general purpose input/output ("GPIO") ports 807. GPIO ports 807 may be programmable. The digital block array may be configured to implement a variety of digital logic circuits (e.g., DACs, digital filters, or digital control systems) using, in one embodiment, configurable user modules ("UMs"). The digital block array may be coupled to a system bus. Processing device 810 may also include memory, such as random access memory ("RAM") 805 and program flash 804. RAM 805 may be static RAM ("SRAM"), and program flash 804 may be a non-volatile storage, which may be used to store firmware (e.g., control algorithms executable by processing core 802 to implement operations described herein). The memory may include instructions that when executed perform the method described herein. Processing device 810 may also include a microcontroller unit ("MCU") 803 coupled to memory and the processing core 802.

As illustrated, capacitance sensor 801 may be integrated into processing device 810. Capacitance sensor 801 may include analog I/O for coupling to an external component, such as capacitive sensor array 820, touch-sensor buttons 840, and/or other devices. Capacitance sensor 801 and processing device 810 are described in more detail below.

The embodiments described herein can be used in any capacitive sensor array application, for example, the capacitive sensor array 820 may be a touch screen, a touch-sensor slider, or touch-sensor buttons 840 (e.g., capacitance sensor buttons). The operations described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 870, including but not limited to pick buttons, sliders (ex. display brightness and contrast), scroll-wheels, multi-media control (ex. volume, track advance, etc) handwriting recognition and numeric keypad operation.

In one embodiment, the electronic system 800 includes a capacitive sensor array 820 of sensor elements coupled to the processing device 810 via bus 821. In an embodiment, the capacitive sensor array may include sensor elements 104 of FIG. 1. The capacitive sensor array 820 of the sensor elements may include a one-dimensional sensor array in one embodiment and a two dimensional sensor array in another embodiment. Alternatively or additionally, the capacitive sensor array 820 of the sensor elements may have more dimensions. The capacitive sensor array 820 may employ projected capacitive technology in which the capacitive sensor elements of the capacitive sensor array are formed in one or more capacitive sensor layers upon a substrate (not shown) of the capacitive sensor array 820. For example, the capacitive sensor elements may be patterned over an image display (e.g., a liquid crystal display) in one or more layers of transparent conducting film deposited on a glass substrate. A protective transparent layer (e.g., glass or plastic film) may cover the capacitive sensor elements to shield them from environmental damage.

Also, in one embodiment, the capacitive sensor array 820 of the sensor elements may be sliders, touchpads, touch screens or other sensing devices. In another embodiment, the electronic system 800 includes touch-sensor buttons 840 coupled to the processing device 810 via bus 841. Touch-sensor buttons 840 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 840 may have a single sensor element to detect the presence of the conductive object. In one embodiment, touch-sensor buttons 840 may include a capacitive sensor element. Capacitive sensor elements may be used as non-contact sensor elements. These sensor elements, when protected by an insulating layer, offer resistance to severe environments.

The electronic system 800 may include any combination of one or more of the capacitive sensor array 820, and/or touch-sensor button 840. In another embodiment, the electronic system 800 may also include non-capacitance sensor elements 870 coupled to the processing device 810 via bus 871. The non-capacitance sensor elements 870 may include buttons, light emitting diodes ("LEDs"), and other user interface devices, such as a mouse, a keyboard, or other functional keys that do not require capacitance sensing. In one embodiment, busses 871, 841, 831, and 821 may be a single bus. Alternatively, these buses may be configured into any combination of one or more separate buses.

Processing device 810 may include internal oscillator/clocks 806 and communication block ("COM") 808. The oscillator/clocks block 806 provides clock signals to one or more of the components of processing device 810. Communication block 808 may be used to communicate with an external component, such as a host processor 850, via host interface ("I/F") line 851. Alternatively, processing device 810 may also be coupled to the embedded controller 860 to communicate with the external components, such as host processor 850. In one embodiment, the processing device 810 is configured to communicate with the embedded controller 860 or the host processor 850 to send and/or receive data.

Processing device 810 may reside on a common carrier substrate such as, for example, an integrated circuit ("IC") die substrate, a multi-chip module substrate, or the like. Alternatively, the components of processing device 810 may be one or more separate integrated circuits and/or discrete components. In one exemplary embodiment, processing device 810 may be the Programmable System on a Chip ("PSoC®") processing device, developed by Cypress Semiconductor Corporation, San Jose, Calif. Alternatively, processing device 810 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 850, but may include a system that measures the capacitance on the sense device and sends the raw data to another host computer where it is analyzed by an application. In effect, the processing that is done by processing device 810 may also be done in the host computer.

It is noted that the processing device 810 of FIG. 8 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). In some embodiments, the processing device 810 may provide multi-touch capability through simultaneously detecting multiple conductive objects proximate to different regions of the capacitive sensor array 820. In an embodiment, the processing device 810 may include and/or provide the functionality of one or more of the sensing module 106 of FIG. 1 and/or the signal sensor 220, the presence detector 224, the position module 226, and the region value module 222 as described above with respect to FIG. 2 and various other figures.

Capacitance sensor 801 may be integrated into the IC of the processing device 810, or alternatively, in a separate IC. The capacitance sensor 801 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 801 may be generated and compiled for incorporation into other integrated circuits. For example, behavioral level code describing capacitance sensor 801, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 801.

It will be noted that the components of the electronic system 800 may include only some or all the discrete components described above, or some combination thereof.

In one embodiment, electronic system 800 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Methods and apparatus to detect presence of an input object have been described. Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method of detecting a presence of an input object, the method comprising:
    using a processor and a plurality of first region values, calculating a second region value such that a signal to noise ratio of the second region value is greater than a lowest signal to noise ratio out of the plurality of first region values, each of the plurality of first region values reflecting sensor element activity in a corresponding region of an input module, the second region value reflecting sensor element activity of a group of the corresponding regions; and
    determining that the input object is present relative to the group of the corresponding regions if the second region value meets or exceeds a threshold presence value.

2. The method of claim 1, wherein the calculating of the second region value includes calculating a sum of the plurality of first region values.

3. The method of claim 1, wherein the calculating of the second region value includes applying a weight factor to at least one of the plurality of first region values.

4. The method of claim 1, wherein the sensor element activity in each corresponding region of the input module includes a change in capacitance of sensor elements within each corresponding region.

5. The method of claim 1, further comprising determining a position of the input object in a coordinate system of the input module using at least one of the plurality of first region values.

6. The method of claim 5, wherein the determining of the position of the input object includes using the at least one of the plurality of first region values in a centroid calculation.

7. A sensing module comprising:
    a region value module configured to generate a plurality of first region values, each of the plurality of first region values reflecting sensor element activity in a corresponding region of an input module; and
    a presence detector coupled to the region value module, the presence detector configured to use the plurality of the first region values to calculate a second region value such that a signal to noise ratio of the second region value is greater than a lowest signal to noise ratio out of the plurality of first region values, the second region value reflecting sensor element activity in a group of the corresponding regions and the presence detector configured to determine that the input object is present relative to the group of corresponding regions if the second region value meets or exceeds a threshold presence value.

8. The sensing module of claim 7, wherein the presence detector is configured to calculate the second region value as a sum of the plurality of first region values.

9. The sensing module of claim 8, wherein the presence detector is configured to apply a weight factor to at least one of the plurality of first region values to calculate the second region value.

10. The sensing module of claim 7, further comprising a signal sensor configured to determine sensor activity in each corresponding region of the input module, wherein the sensor activity includes a change in capacitance of sensor elements within each corresponding region.

11. The sensing module of claim 7, further comprising a position module configured to determine a position of the input object in a coordinate system of the input module using at least one of the plurality of first region values.

12. The sensing module of claim 11, wherein the position module is configured to use the at least one of the plurality of first region values in a centroid calculation to determine the position of the input object.

13. A sensing system comprising:
   a processing device; and
   a capacitive sensor array coupled with the processing device, the processing device comprising a region value module configured to generate a plurality of first region values, each of the plurality of first region values reflecting sensor element activity in a corresponding region of the capacitive sensor array, the processing device comprising a presence detector coupled to the region value module, the presence detector configured to use the plurality of the first region values to calculate a second region value such that a signal to noise ratio of the second region value is greater than a lowest signal to noise ratio out of the plurality of first region values, the second region value reflecting sensor element activity in a group of the corresponding regions, the presence detector configured to determine that an input object is present relative to the group of the corresponding regions if the second region value meets or exceeds a threshold presence value.

14. The sensing system of claim 13, wherein the presence detector is configured to calculate the second region value as a sum of the plurality of first region values.

15. The sensing system of claim 14, wherein the presence detector is configured to apply a weight factor to at least one of the plurality of first region values to calculate the second region value.

16. The sensing system of claim 13, further comprising a signal sensor configured to determine sensor activity in each corresponding region of the capacitive sensor array, wherein the sensor activity includes a change in capacitance of sensor elements within each corresponding region.

17. The sensing system of claim 13, further comprising a position module configured to determine a position of the input object in a coordinate system of the capacitive sensor array using at least one of the plurality of first region values in a centroid calculation.

* * * * *